US008456847B2

(12) United States Patent
Hwang et al.

(10) Patent No.: US 8,456,847 B2
(45) Date of Patent: Jun. 4, 2013

(54) MOBILE TERMINAL

(75) Inventors: Yong-Jin Hwang, Seoul (KR); Min-Soo Kim, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 12/491,028

(22) Filed: Jun. 24, 2009

(65) Prior Publication Data

US 2009/0323292 A1 Dec. 31, 2009

(30) Foreign Application Priority Data

Jun. 25, 2008 (KR) ........................ 10-2008-0060425

(51) Int. Cl.
*H05K 5/00* (2006.01)
*H04M 1/00* (2006.01)

(52) U.S. Cl.
USPC ....................................... 361/730; 455/575.4

(58) Field of Classification Search
USPC ............... 361/730, 737; 455/575.1, 95, 575.4
See application file for complete search history.

(56) References Cited

U.S. PATENT DOCUMENTS

| | | | |
|---|---|---|---|
| 6,751,473 B1* | 6/2004 | Goyal et al. ................ 455/556.1 |
| 7,304,864 B2* | 12/2007 | Chen et al. ................... 361/815 |
| 7,507,041 B2* | 3/2009 | Ueda et al. .................... 396/423 |
| 7,761,090 B2* | 7/2010 | Silverbrook et al. ......... 455/418 |
| 7,797,818 B2* | 9/2010 | Saboune ........................ 29/718 |
| 7,869,839 B2* | 1/2011 | Jung .......................... 455/575.1 |
| 7,912,520 B2* | 3/2011 | Choi et al. ................. 455/575.1 |
| 8,005,517 B2* | 8/2011 | Kang et al. ................. 455/575.1 |
| 2004/0240688 A1* | 12/2004 | Chiang et al. ................. 381/306 |
| 2005/0265574 A1* | 12/2005 | Holmes et al. ................ 381/388 |
| 2005/0282593 A1* | 12/2005 | Spence et al. .............. 455/575.3 |
| 2006/0194612 A1* | 8/2006 | Chen .......................... 455/556.1 |
| 2007/0021156 A1* | 1/2007 | Hoong et al. .............. 455/575.1 |
| 2007/0049357 A1* | 3/2007 | Daimon et al. ............ 455/575.1 |
| 2008/0015000 A1* | 1/2008 | Jung .......................... 455/575.1 |
| 2008/0090618 A1* | 4/2008 | Lim et al. ...................... 455/566 |
| 2008/0090627 A1* | 4/2008 | Jeong et al. ................ 455/575.4 |
| 2008/0102904 A1* | 5/2008 | Kang et al. ................. 455/575.1 |
| 2008/0176609 A1* | 7/2008 | Kim et al. .................. 455/575.1 |
| 2008/0291647 A1* | 11/2008 | Hirota et al. .................. 361/752 |
| 2009/0116202 A1* | 5/2009 | Kim et al. ..................... 361/752 |
| 2010/0151925 A1* | 6/2010 | Vedurmudi et al. ........ 455/575.4 |

* cited by examiner

*Primary Examiner* — Lisa Lea Edmonds
*Assistant Examiner* — Xanthia C Cunningham
(74) *Attorney, Agent, or Firm* — Birch, Stewart, Kolasch & Birch, LLP (57) ABSTRACT

A mobile terminal includes: a display unit that displays information; and a frame that fixedly surrounds the display unit and is fixed to a terminal case, wherein the frame includes at least one supplementary module mounting unit allowing a supplementary module that performs a different function from that of the display unit to be integrally mounted thereon. A supplementary module different from the display unit is integrally mounted on a frame constituting a display assembly, so handling and assembling can be facilitated and production cost can be reduced.

14 Claims, 7 Drawing Sheets

MOBILE TERMINAL

CROSS REFERENCE TO RELATED APPLICATIONS

The present application claims priority to Korean Application No. 10-2008-0060425 filed in Korea on Jun. 25, 2008 the entire contents of which is hereby incorporated by reference in its entirety.

BACKGROUND OF THE INVENTION

1. Field of the Invention

The present invention relates to a display assembly of a mobile terminal.

2. Description of the Related Art

A mobile terminal is a portable device having one or more functions of voice and video communications, inputting/outputting information, storing data, or the like.

As mobile terminals have various functions besides communication, such as capturing images and video via a camera, playing music files or video, playing games, receiving broadcasts, or the like, mobile terminals are implemented in the form of comprehensive multimedia players.

Efforts are ongoing to support and increase the complicated functions of the multimedia players, in terms of hardware or software. For example, a user interface (UI) environment is provided to allow users to easily and conveniently search or select functions.

As mobile terminals is becoming thinner and lighter, the size of components mounted in mobile terminals needs to be reduced and an unnecessary space should be removed. In addition, the components are to be disposed such that they properly operate without affecting the function implementation of other components.

A display mounted on the mobile terminal is commonly handled as a module configured by integrating (or uniting) a display unit for displaying visual information and a board for controlling the display unit.

However, in the related art mobile terminal, the display assembly is separately manufactured from the components of different functions and assembled, increasing the space taken by the display assembly at the inner side the mobile terminal, so there is a limitation in reducing the size of the mobile terminal.

SUMMARY OF THE INVENTION

Accordingly, one object of the present invention is to address the above-noted and other problems.

Another object of the present invention is to provide a mobile terminal manufactured to be smaller and thinner by including a display assembly without having to form a shape or a structure for mounting components at an inner side of a terminal case.

To achieve these and other advantages and in accordance with the purpose of the present invention, as embodied and broadly described herein, the present invention provides in one aspect a mobile terminal including: a display unit that displays information; and a frame that fixedly surrounds the display unit and is fixed to a terminal case, wherein the frame includes at least one supplementary module mounting unit allowing a supplementary module that performs a different function from that of the display unit to be integrally mounted thereon.

The supplementary module may be disposed near the display unit.

The supplementary module mounting unit may include a girth that surrounds the supplementary module.

The supplementary module mounting unit and a display unit mounting unit on which the display unit is mounted communicate so that the supplementary module and the display unit may be mounted to be in contact with each other.

The outermost part of the supplementary module mounting unit may be open.

The supplementary module may be at least one of a camera, a speaker, an input circuit board.

A connection unit for connecting the supplementary module may be integrally formed with a connection unit of the display unit.

To achieve these and other advantages and in accordance with the purpose of the present invention, as embodied and broadly described herein, the present invention provides in another aspect a mobile terminal including: a display unit that outputs visual information; a frame that fixedly surrounds the display unit and is mounted on a terminal case; and at least one or more selected from among a camera, a speaker and a dome switch board which are directly and integrally mounted on the frame. In this case, the frame may include a first mounting unit on which the display unit is mounted; and a second mounting unit on which at least one or more selected from among the camera, the speaker and the dome switch board is mounted.

To achieve these and other advantages and in accordance with the purpose of the present invention, as embodied and broadly described herein, the present invention provides in still another aspect a display assembly including: a display unit that displays information; and a frame that fixedly surrounds the girth of the display unit, wherein the frame includes at least one mounting unit on which a supplementary module performing a different function from that of the display unit is integrally mounted thereon.

To achieve these and other advantages and in accordance with the purpose of the present invention, as embodied and broadly described herein, the present invention provides in another aspect a mobile terminal including: a display unit that displays information; and a frame fixed to a terminal case, wherein the frame comprises: a first portion that surrounds the display unit; and a second portion that surrounds a supplementary module that performs a different function from that of the display unit, the second portion being laterally next to the first portion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
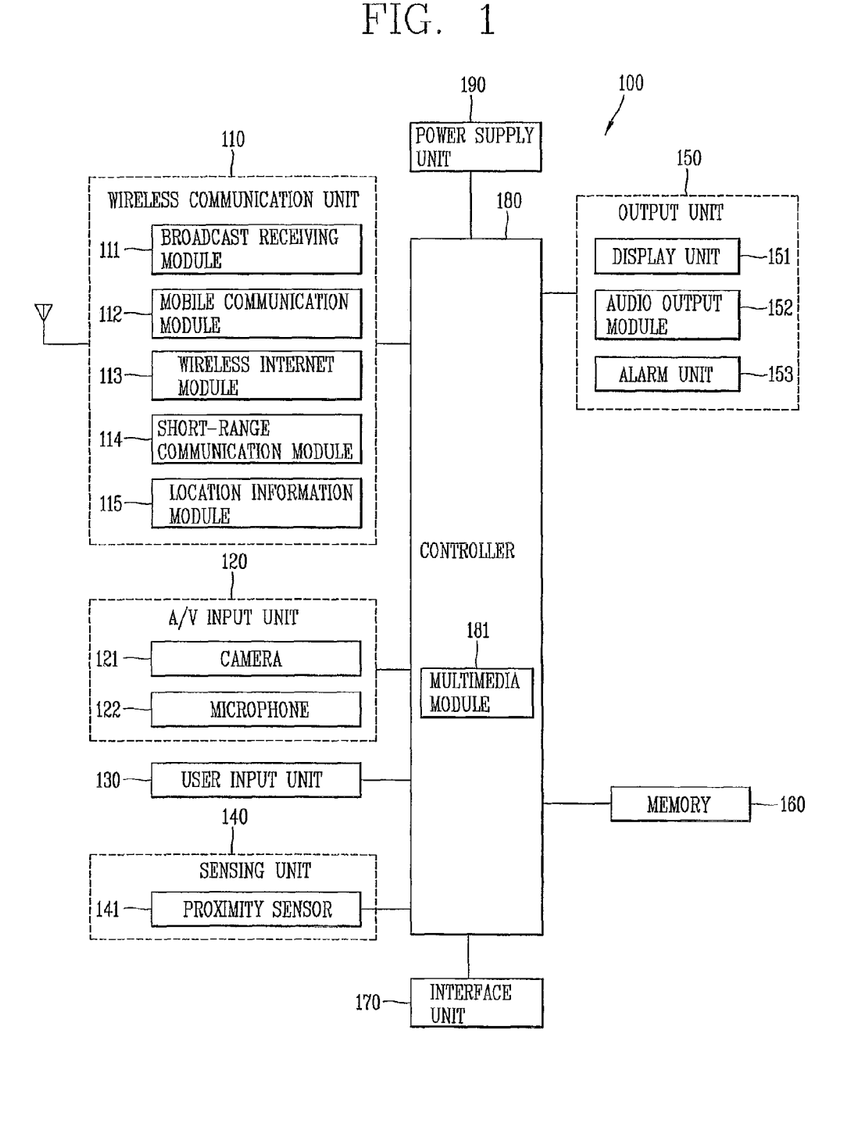
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc.

FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the user touches the touch screen with his finger tip in a flicking manner to perform an operation of quickly moving a select menu (or a selection bar) or a cursor displayed thereon the sensing unit 140 may sense the user's manipulation to generate a corresponding sense signal.

Also, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough.

Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. Atypical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit.

The touch screen may be configured to detect a touch input pressure as well as a touch input position and a touch input area. The touch screen may detect a user's touch and manipulation such as dragging, scrolling, flicking, or the like by interworking with the sensing unit 140.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

As for the RF oscillation type proximity sensor, when an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. In addition, the memory 160 may store data regarding various patterns of vibrations and audio signals to be outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

A communication system in which the mobile terminal according to the present invention can operate will now be described with reference to FIG. 2.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 2:
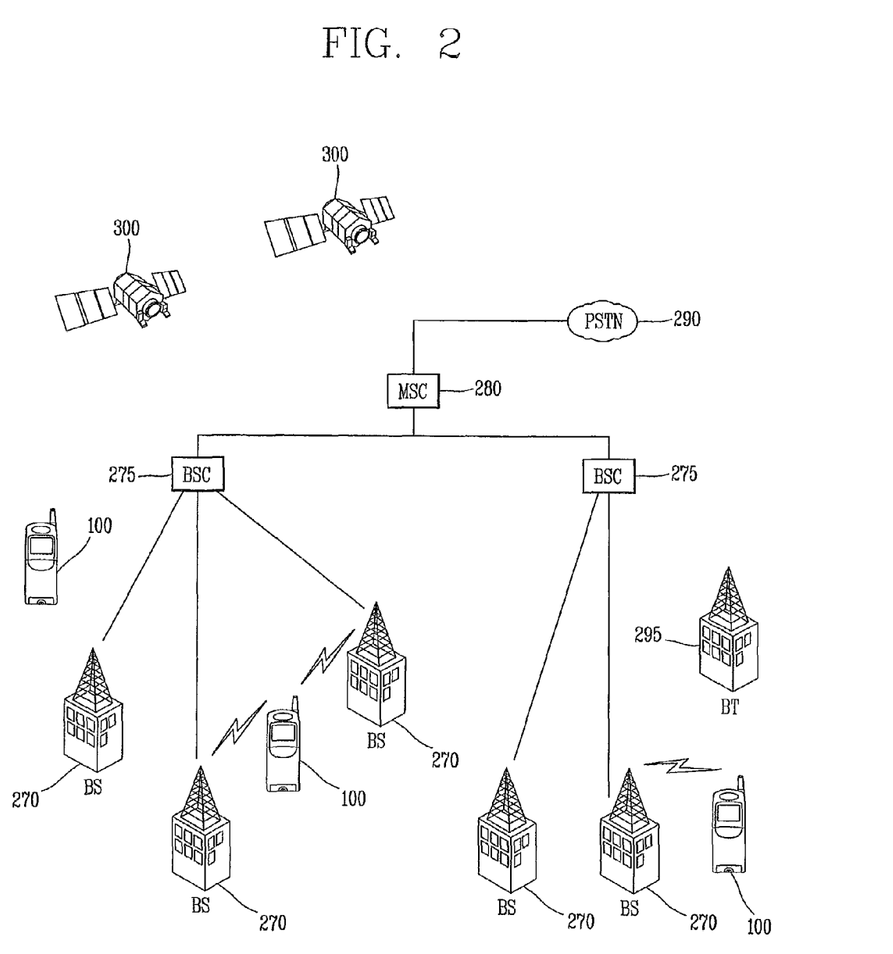
FIG. 2 is a block diagram of a wireless communication system with which the mobile terminal according to an embodiment of the present invention is operable.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 2, several global positioning systems (GPS) satellites 300 are shown. The satellites 300 help locate at least one of a plurality of terminals 100.

In FIG. 2, two satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270.

The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

The shape or structural characteristics of the mobile terminal according to the present invention will now be described with reference to FIGS. 3 to 7.

Figure 3:
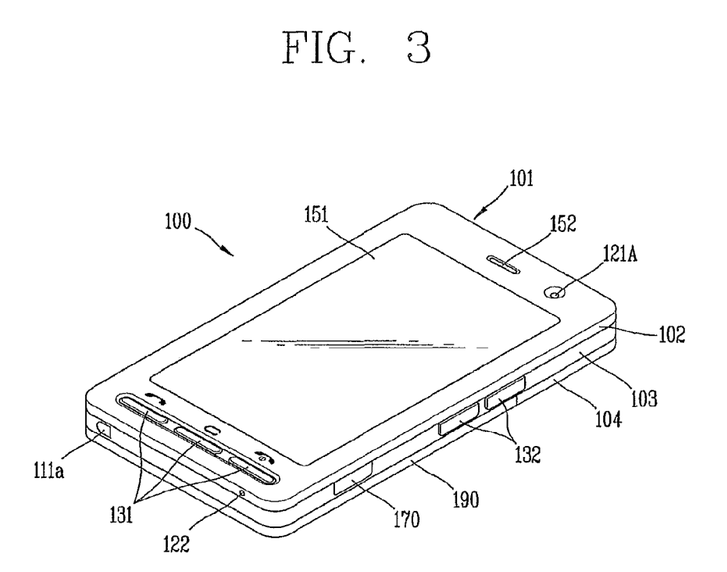
FIG. 3 is a front perspective view of the mobile terminal implementing an embodiment of the present invention.

FIG. 3 is a front perspective view of the mobile terminal implementing an embodiment of the present invention. As shown in FIG. 3, the mobile terminal includes a bar type terminal body 101, and the terminal body 101 includes cases 102, 103, and 104 (which may be also called a casing, a housing, a cover, or the like) constituting the external appearance. The shape of the terminal body 101 is not limited to the exempla as shown in FIG. 1, and the present invention can be also applicable to a slide type mobile terminal, a folder type mobile terminal, a swing type mobile terminal, and the like, including two or more bodies.

The cases 102 to 104 may be formed by injection-molding a synthetic resin or may be made of a metallic material such as stainless steel (STS) or titanium (Ti), etc.

The display unit 151, the audio output module 152, and the first user input unit 131 may be located on the front surface of the terminal body 101.

The display unit 151 may include an LCD (Liquid Crystal Display) module, an OLED (Organic Light Emitting Diode) module, e-paper, a transparent OLED, and the like, that visually displays information.

The audio output unit 152 may be implemented in the form of a receiver or a loud speaker.

The first user input unit (or user interface) 131 may be implemented as a dedicated input device, discriminated from a touch screen or a touch pad.

A first camera 121A may be implemented in the form of a camera module for capturing images or video with respect to the user and other objects.

The second user input unit 132, the microphone 122, or the interface unit 170 may be disposed at the side of the terminal body 101.

The second user input unit 132 may be also called a side key and the like. The first and the second user input units 132 may be generally referred to as a manipulating portion, and various methods and techniques can be employed for the manipulation unit so long as they can be operated by the user in a tactile manner. For example, the user input units can be implemented as a dome switch, a touch screen, or a touch pad that can receive user commands or information according to the user's touch operations (e.g., pressing, pushing, swiping, drag-and-drop, etc.) or may be implemented in the form of a rotatable control wheel (or disc) for rotating keys, or a jog dial, a joystick, or the like.

In terms of their functions, the first user input unit 131 is used for inputting (entering) commands such as start, end, scroll or the like, and the second user input unit 132 is used as a hot key for performing a particular function such as adjusting a state amount (volume, brightness, searching of menus, etc.) or activating the camera 121A, or the like. The mobile terminal 100 is mainly operating in an idle mode, and the idle mode may be released by manipulation of the user input units 131 and 132.

The microphone 122 (or other sound pick-up device) may be appropriately implemented to detect user voice inputs, other sounds, and the like. Unlike the microphone as illustrated in FIG. 3, the microphone 122 may be disposed on the front surface of the terminal body 101.

The interface unit 170 may be used as a communication link (or passage, path, etc.) through which the mobile terminal 100 can exchange data or the like with an external device.

The interface unit 170 has been described above with reference to FIG. 1, so its detailed description will be omitted.

A broadcast signal receiving antenna 111a may be disposed (externally or internally) at one side or region of the terminal body 101, in addition to an antenna that is used for mobile communications. The antenna 111a may be configured to be retractable from the terminal body 101.

Figure 4:
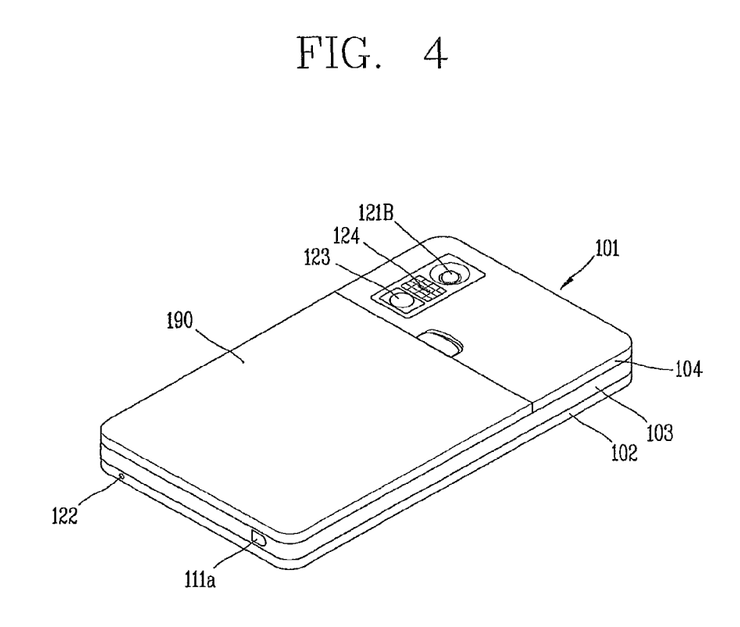
FIG. 4 is a rear perspective view of the mobile terminal of FIG. 3.

FIG. 4 is a rear perspective view of the mobile terminal of FIG. 3.

With reference to FIG. 4, the power supply unit 190 for supplying power to the mobile terminal 100 may be located on the rear surface of the terminal body 101. The power supply unit 190 may be, for example, a rechargeable battery that can be detachably combined.

A second camera 121B may additionally be disposed on another region of the rear surface of the terminal body 101 in addition to the first camera 121A. The second camera 121B may have an image capture direction which is substantially opposite to that of the first camera 121A and may support a different number of pixels (i.e., have a different resolution) from the camera 121A. For example, the first camera 121A may operate with a relatively lower resolution to capture an image(s) of the user's face and immediately transmit such image(s) to another party in real-time during video call communication or the like, and the second camera 121B may operate with a relatively higher resolution to capture images of general objects with high picture quality, which may not require immediately transmission in real-time, but may be stored for later viewing or use.

A flash 124 and a mirror 123 may be additionally disposed adjacent to the second camera 121B. When an image of the subject is captured with the second camera 121B, the flash 124 illuminates the subject. The mirror 123 allows the user to see himself when he wants to capture his own image (i.e., self-image capturing) by using the second camera 121B.

Figure 5:
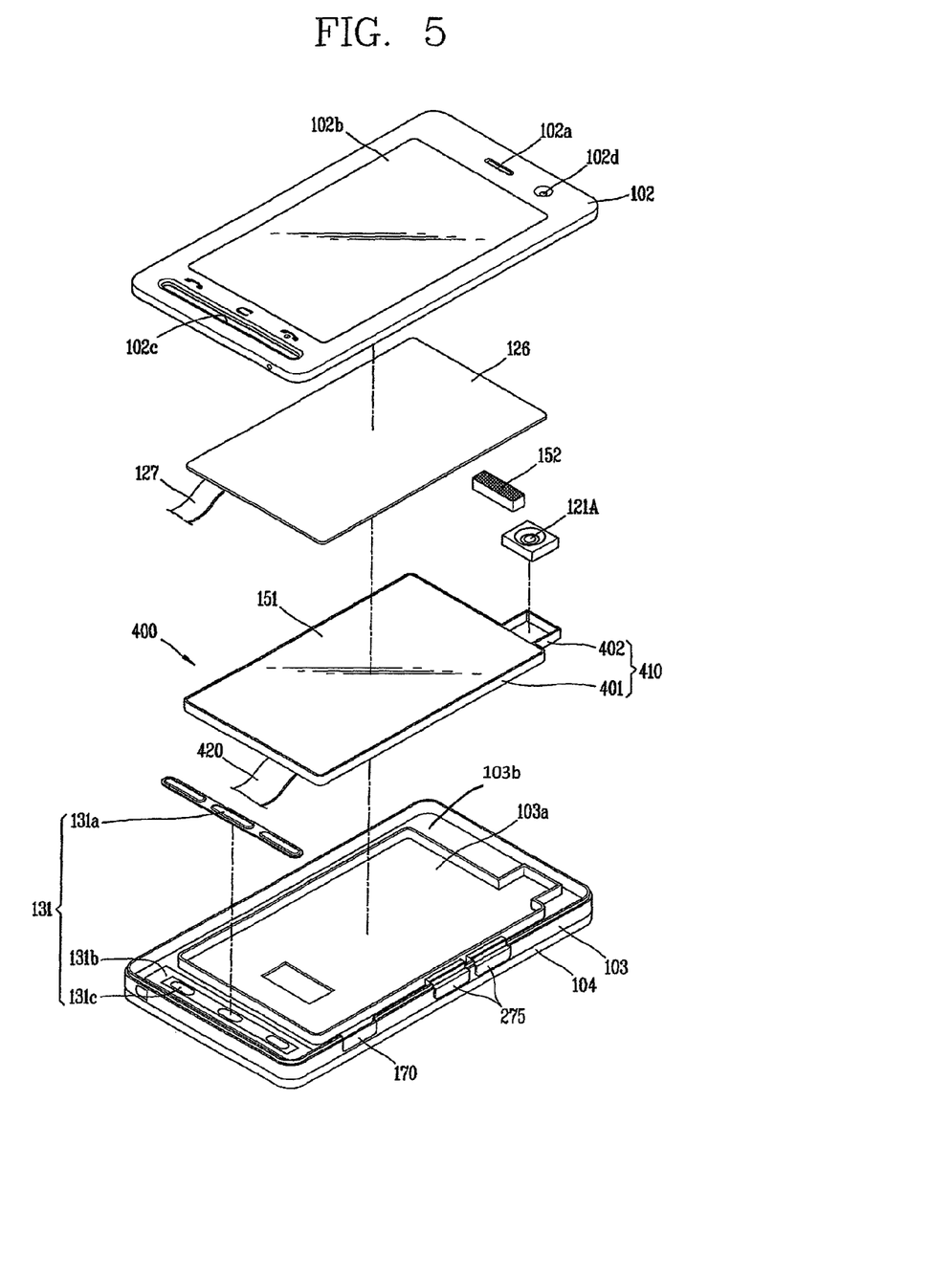
FIG. 5 is an exploded perspective view of the mobile terminal of FIG. 3.

FIG. 5 is an exploded perspective view of the mobile terminal of FIG. 3. With reference to FIG. 5, a middle case (or intermediate support member) 103 is provided to support components between the front case 102 and the rear case 104, and a mounting unit 103a is formed on an upper mounting surface of the middle case 103 to support a display assembly 400. The mounting unit 103a has an upwardly extending wall 103b that corresponds to the shape of the frame 410, which will be described below.

A first hole 102a is formed at an upper end portion of the front case 102 to transfer sound outputted from the audio output module 152 to the exterior, and a second hole 102c is formed at a lower end portion of the front case 102 to expose the first user input unit 131. The front case 102 includes a first transmissive region 102b formed at a front side of the display unit 151 to allow the display unit 151 to be seen, and a second transmissive region 102d allowing light to pass through the first camera 121A. Here, the window where the first and second transmissive regions 102b and 102d may be separately manufactured from the front case 102 and assembled to the front case 102.

A touch detecting unit 126 for detecting a touch applied to the first transmissive region 102b is disposed at a lower side of the first transmissive region 102b. The touch detecting unit 126 may be configured by patterning a transparent electrode on a transparent film to detect a change in pressure or capacitance according to applications. The transparent electrode may be made of indium-tin-oxide (ITO), and ITO may be patterned on the transparent film according to a deposition method. A connection unit 127 is attached at one side of the touch detecting unit 126 to transfer a signal detected by the transparent electrode to a circuit board (not shown) for performing controlling operation. The connection unit 127 may be configured in the form of a flexible printed board.

The touch detecting unit 126 may be directly attached to a lower surface of the front case 102 to increase visibility of the display unit 151, and an anti-reflection coating unit may be additionally attached to at least one of the upper and lower surfaces of the touch detecting unit 125 to reduce reflection.

The display assembly 400 is provided at an inner side of the touch detecting unit 126. As shown in FIG. 5, the display assembly 400 is configured with an external appearance that can be mounted on the mounting unit 103a formed at the middle case 103.

At the display assembly 400, a supplementary module for implementing a different function from the display unit 151 is also integrally mounted in addition to the display unit that displays visual information. The display unit 151 may be configured in the form of a panel and may be integrally formed with the board for performing controlling operation. The display unit 151 includes a liquid crystal display (LCD), an organic light emitting diode (OLED), E-paper, transparent LED (TOLED)/LCD, and the like.

The supplementary module refers to a module for performing other function than that of the display unit 151, for example, performing a user input, an audio output or an image input, and FIG. 5 illustrates the first camera 121A as the supplementary module.

The display unit 151 and the first camera 121A are combined in the form of an integrated assembly by a frame 410. To this end, the frame 410 includes a display unit mounting unit 401 on which the display unit 151 is mounted and an camera mounting unit 402 on which the first camera 121A is mounted. The frame 410 may be also called a mounter as another terminology.

The camera mounting unit 402 is configured such that the display unit mounting unit 401 extends, and the display unit mounting unit 401 and the camera mounting unit 402 communicate with each other so that the first camera 121A and the display unit 151 can be mounted to be directly in contact with each other. Accordingly, compared with the related art in which the first camera 121A is separately fabricated and assembled separately from the display assembly, the manufacturing and assembling can be facilitated, and the mounting unit for fixing the first camera 121A can be effectively prevented from being enlarged. In addition, the size of the mobile terminal 100 can be reduced as much as the mounting unit of the first camera 121A is reduced.

The frame 410 includes a girth surrounding the side of the display unit 151, and such girth may be formed along the display unit mounting unit 401 and the camera mounting unit 402.

The first user input unit 131 includes key buttons 131a and an input board 131b on which switches 131c operated by the key buttons 131a. The input board 131b may be formed as a thin flexible printed circuit board to reduce its thickness.

Figure 6:
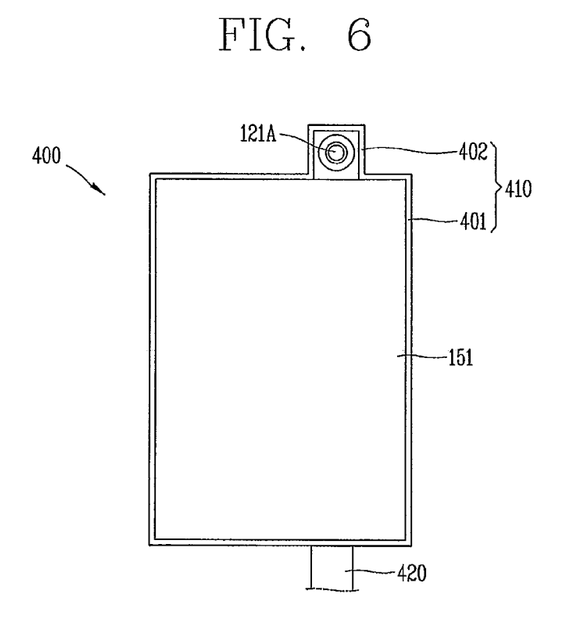
FIG. 6 is a plan view of one example of a display assembly according to an embodiment of the present invention.

FIG. 6 is a plan view of the display assembly according to an exemplary embodiment of the present invention. With reference to FIG. 6, the display assembly 400 is integrally assembled with the display unit 151 displaying visual information and the first camera 121A for capturing images by the frame 410.

Accordingly, the display unit 151 and the first camera 121A are firmly supported by the girth of the frame 410 surrounding them.

An integrated connector 420 integrating a connection unit of the display unit 151 and that of the first camera 121A is provided at one side of the display assembly 400. The integrated connector 420 effectively solves the problem of the related art in which the camera is separately handled with the display assembly, so a connection unit should be additionally provided to connect the camera, making the internal space of the mobile terminal complicated.

Figure 7:
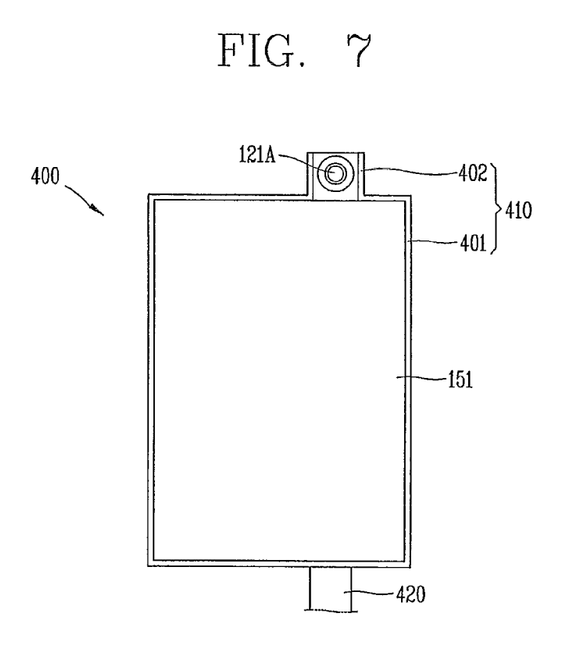
FIG. 7 is a plan view showing another example of the display assembly according to an embodiment of the present invention.

FIG. 7 shows another example of the display assembly according to an exemplary embodiment of the present invention.

As shown in FIG. 7, the camera 121A is integrally formed to be in contact with the display unit 151 by the frame 410, and the outermost girth portion of the camera mounting unit 402 for mounting the camera 121A is open. Accordingly, the size of the display assembly 400 can be reduced as much as the thickness of the at least open girth portion of the camera mounting unit 402.

Figure 8:
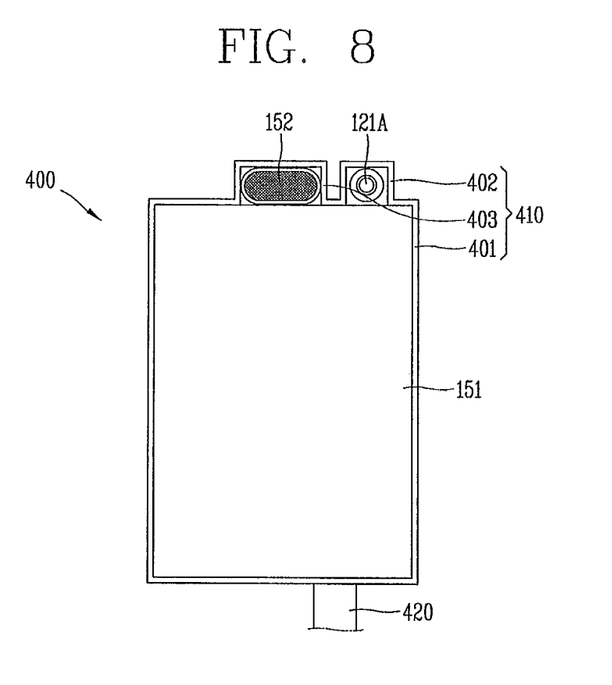
FIG. 8 is a plan view showing still another example of the display assembly according to an embodiment of the present invention.

FIG. 8 shows still another example of the display assembly according to an exemplary embodiment of the present invention.

The display assembly 400 as shown in FIG. 8 is configured such that the audio output module 152 is also integrally modularized as well as the camera 121A. To this end, the frame 410 includes the display unit mounting unit 401 on which the display module 151 is mounted, the camera mounting unit 402 on which the camera 121A is mounted, and an audio output module mounting unit 403 on which the audio output module 152 is mounted. The camera mounting unit 402 and the audio output module mounting unit 403 have such a shape that the display unit mounting unit 401 with a relatively large size extends to form them.

With such configuration, because an additional frame or a mounter unit for fixing the audio output module 152 can be omitted and instead substituted by the frame 410 of the display assembly 400, handling and assembling can be facilitated and the fabrication cost can be reduced.

Figure 9:
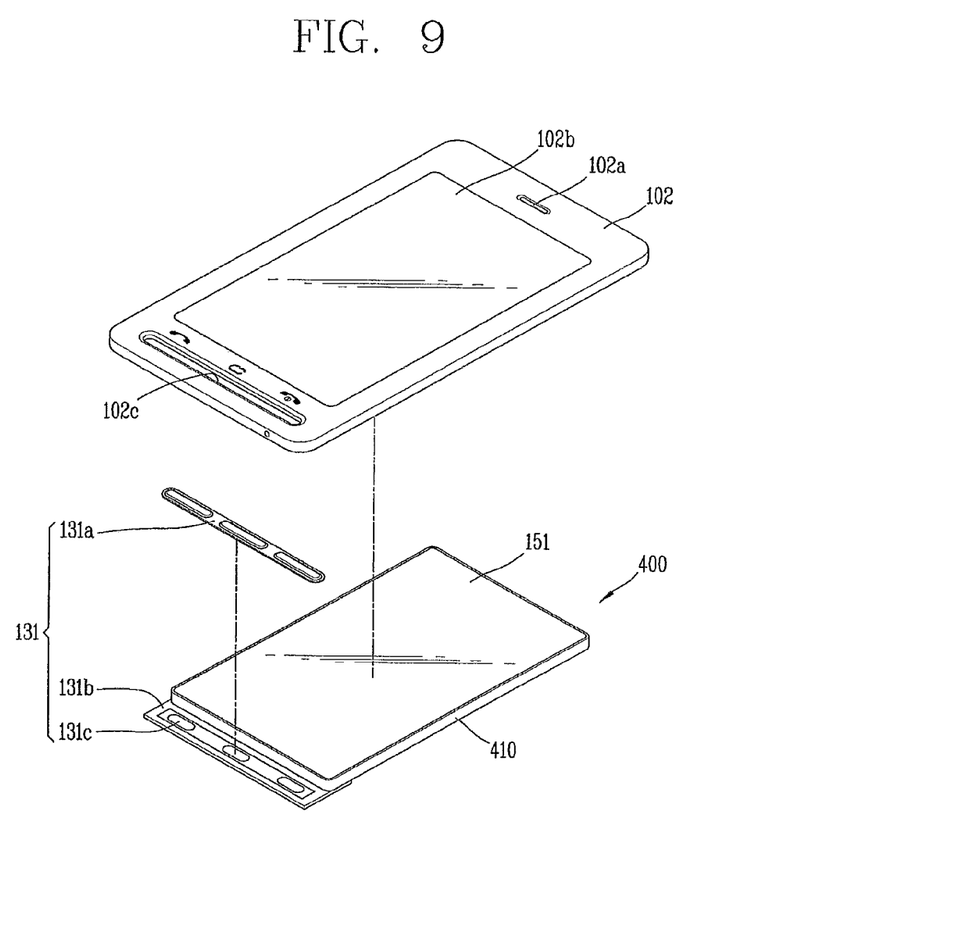
FIG. 9 is a plan view showing yet another example of the display assembly according to an embodiment of the present invention.

FIG. 9 is a separated perspective view showing another form of the display assembly according to an exemplary embodiment of the present invention.

With reference to FIG. 9, the input circuit board 131b, an element of the user input unit 131, is integrally formed with the display unit 151. Namely, the display assembly 400 is manufactured together with the input circuit board 131b on which the switches 131c are mounted in addition to the display unit 151, and handled like an independent component for assembling the mobile terminal. In this case, a connection unit of the display unit 151 is integrated with that of the input circuit board 131b for a simpler configuration.

As so far described, the mobile terminal according to the embodiments of the present invention has the following advantages.

That is, because the supplementary module different from the display unit is integrally mounted at the frame constituting the display assembly, handling and assembling can be facilitated and the production cost can be reduced.

In addition, because an increase in the volume that may be generated due to a fixing unit for fixing the supplementary module is minimized, the mobile terminal can become smaller and compact.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A mobile terminal comprising:
a front case;
a rear case;
an intermediate support member configured to support components between the front and rear cases;
a display unit that displays information, the display unit being located at the front case;
a camera configured to perform a different function than that of the display unit;
a frame that substantially surrounds a perimeter of the display unit, the frame being fixed to the intermediate support member, the frame including a camera mounting unit, the camera being integrally formed with the camera mounting unit; and
a mounting unit formed on an upper mounting surface of the intermediate support member to support the frame,
wherein the front case comprises a first transmissive region formed on a front side of the display unit and a second transmissive region allowing light to pass through the camera unit,
wherein the mounting unit comprises a first wall formed at outer edges of the intermediate support member and a second wall that protrudes from the upper mounting surface of the intermediate support member toward the front case and that corresponds to a shape of the frame, and
wherein the second wall is formed within the first wall and the second wall surrounds the frame mounted on the mounting unit.

2. The mobile terminal of claim 1, wherein the camera is disposed next to the display unit.

3. The mobile terminal of claim 1, wherein the camera mounting unit surrounds at least a portion of the perimeter of the camera.

4. The mobile terminal of claim 3, wherein the frame includes a display unit mounting unit to which the display unit is mounted, the display mounting unit and camera mounting unit being in communication such that the camera contacts the display unit.

5. The mobile terminal of claim 3, wherein a portion of the camera mounting unit opposite the display unit is open.

6. The mobile terminal of claim 1, further comprising a supplemental module configured to perform a different function than that of the display unit,
wherein the frame includes a supplemental module mounting unit, said supplemental module being integrally formed with said supplemental module mounting unit.

7. The mobile terminal of claim 1, wherein the connection unit of the camera is integrally formed with the connection unit of the display unit.

8. A mobile terminal comprising:
a front case;
a rear case;
an intermediate support member provided to support components between the front and rear cases;
a display unit that displays information, the display unit being located at the front case;
a frame that substantially surrounds a perimeter of the display unit, the frame being accommodated in the intermediate support member;
a first supplemental module being mounted to the frame, the first supplemental module being a camera; and
a mounting unit formed on an upper mounting surface of the intermediate support member to support the frame, wherein the front case comprises a first transmissive region formed on a front side of the display unit and a second transmissive region allowing light to pass through the camera, wherein the mounting unit comprises a first wall formed at outer edges of the intermediate support member and a second wall that protrudes from the upper mounting surface of the intermediate support member toward the front case and that corresponds to a shape of the frame and the first supplemental module, and wherein the second wall is formed within the first wall and the second wall surrounds the frame mounted on the mounting unit.

9. The mobile terminal of claim 8, wherein the frame comprises:
   a first mounting unit to which the display unit is mounted; and
   a second mounting unit to which said first supplemental module is mounted.

10. The mobile terminal of claim 9, wherein the second mounting unit surrounds at least a portion of the perimeter of the first supplemental module.

11. The mobile terminal of claim 9, further comprising a second supplemental module mounted to the frame, the second supplemental module being one of a speaker and an input circuit board.

12. The mobile terminal of claim 11, wherein the frame includes a third mounting unit to which said second supplemental module is mounted.

13. The mobile terminal of claim 9, wherein the first supplemental module is disposed next to the display unit.

14. A mobile terminal comprising:
a front case;
a rear case;
an intermediate support member provided to support components between the front and rear cases;
a display unit that displays information, the display unit being located at the front case;
a camera that performs a different function from that of the display unit;
a frame fixed to the intermediate support member, the frame including:
   a first portion that surrounds the display unit; and
   a second portion that surrounds the camera, the second portion being laterally adjacent the first portion; and
a mounting unit formed on an upper mounting surface of the intermediate support member to support the frame,
wherein the front case comprises a first transmissive region formed on a front side of the display unit and a second transmissive region allowing light to pass through the camera,
wherein the mounting unit comprises a first wall formed at outer edges of the intermediate support member and a second wall that protrudes from the upper mounting surface of the intermediate support member toward the front case and that corresponds to a shape of the frame, and
wherein the second wall is formed within the first wall and the second wall surrounds the frame mounted on the mounting unit.

\* \* \* \* \*